(12) United States Patent
Walker et al.

(10) Patent No.: US 6,582,304 B2
(45) Date of Patent: Jun. 24, 2003

(54) SYSTEM AND METHOD FOR PERFORMING LOTTERY TICKET TRANSACTIONS UTILIZING POINT-OF-SALE TERMINALS

(75) Inventors: Jay S. Walker, Ridgefield; James A. Jorasch, Stamford; Sanjay K. Jindal, Wilton, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/836,409

(22) Filed: Apr. 16, 2001

(65) Prior Publication Data

US 2001/0016514 A1 Aug. 23, 2001

Related U.S. Application Data

(63) Continuation of application No. 08/822,709, filed on Mar. 21, 1997, now Pat. No. 6,267,670.

(51) Int. Cl.[7] .............................................. G06F 19/00
(52) U.S. Cl. ............................ 463/17; 273/269; 463/25
(58) Field of Search ............................. 463/16, 17, 25, 463/26; 273/269

(56) References Cited

U.S. PATENT DOCUMENTS

| | | | |
|---|---|---|---|
| 3,573,747 A | 4/1971 | Adams | 340/172.5 |
| 4,108,361 A | 8/1978 | Krause | 235/375 |
| 4,323,770 A | 4/1982 | Dieulot et al. | 235/375 |
| 4,494,197 A | 1/1985 | Troy et al. | 364/412 |
| 4,500,880 A | 2/1985 | Gomersall et al. | 340/825.35 |
| 4,669,730 A | 6/1987 | Small | 273/138 A |
| 4,677,553 A | 6/1987 | Roberts et al. | 364/412 |
| 4,689,742 A | 8/1987 | Troy et al. | 364/412 |
| 4,723,212 A | 2/1988 | Mindrum et al. | 364/401 |
| 4,760,247 A | 7/1988 | Keane et al. | 235/454 |
| 4,815,741 A | 3/1989 | Small | 273/138 A |
| 4,825,045 A | 4/1989 | Humble | 235/383 |
| 4,839,507 A | 6/1989 | May | 235/381 |
| 4,854,590 A | 8/1989 | Jolliff et al. | 273/138 A |
| 4,859,838 A | 8/1989 | Okiharu | 235/383 |
| 4,876,592 A | 10/1989 | Von Kohorn | 358/84 |
| 4,882,473 A | 11/1989 | Bergeron et al. | 235/380 |
| 4,902,880 A | 2/1990 | Garczynski et al. | 235/375 |
| 4,908,761 A | 3/1990 | Tai | 364/401 |
| 4,910,672 A | 3/1990 | Off et al. | 364/405 |
| 4,922,522 A | 5/1990 | Scanlon | 379/95 |
| 4,937,853 A | 6/1990 | Brule et al. | 379/96 |
| 4,973,952 A | 11/1990 | Malec et al. | 340/825.35 |

(List continued on next page.)

FOREIGN PATENT DOCUMENTS

| | | |
|---|---|---|
| EP | 0 109 189 A1 | 5/1984 |
| EP | 512413 A | 11/1992 |
| JP | 5242363 A | 9/1993 |
| WO | WO 96/36926 | 11/1996 |
| WO | WO 97/35441 | 9/1997 |

OTHER PUBLICATIONS

Lisa Fickenscher, "Merchant: American Express Seeks to Mine Its Data on Cardholder Spending Patterns"; The American Banker, p. 20. (Mar. 24, 1997).

(List continued on next page.)

*Primary Examiner*—Joe H. Cheng
*Assistant Examiner*—Julie Brocketti
(74) *Attorney, Agent, or Firm*—Dean P. Alderucci

(57) ABSTRACT

A system and method for performing integrated lottery ticket and merchandise transactions using a point-of-sale terminal that generates a single sales receipt containing all pertinent lottery ticket and merchandise transaction information. The lottery tickets generated include fractional value and "quick-pick" lottery tickets. A group of point-of-sale terminals are connected to a POS controller which communicates with a lottery data processing system. An encrypted authentication code also printed on the sales receipt allows the lottery player to verify all lottery ticket transaction information, as needed.

11 Claims, 13 Drawing Sheets

U.S. PATENT DOCUMENTS

| | | | |
|---|---|---|---|
| 4,982,337 A | 1/1991 | Burr et al. | 364/479 |
| 4,993,714 A | 2/1991 | Golightly | 273/138 A |
| 5,025,372 A | 6/1991 | Burton et al. | 364/406 |
| 5,056,019 A | 10/1991 | Schultz et al. | 364/405 |
| 5,119,295 A | 6/1992 | Kapur | 364/412 |
| 5,128,862 A | 7/1992 | Mueller | 364/405 |
| 5,132,914 A | 7/1992 | Cahlander et al. | 364/478 |
| 5,172,328 A | 12/1992 | Cahlander et al. | 364/478 |
| 5,173,851 A | 12/1992 | Off et al. | 364/401 |
| 5,177,342 A | 1/1993 | Adams | 235/379 |
| 5,192,854 A | 3/1993 | Counts | 235/375 |
| 5,201,010 A | 4/1993 | Deaton et al. | 382/7 |
| 5,216,595 A | 6/1993 | Protheroe | 364/412 |
| 5,223,698 A | 6/1993 | Kapur | 235/375 |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,256,863 A | 10/1993 | Ferguson et al. | 235/383 |
| 5,262,941 A | 11/1993 | Saladin et al. | 364/408 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,026 A | 3/1994 | Hoffman | 364/408 |
| 5,297,031 A | 3/1994 | Gutterman et al. | 364/408 |
| 5,302,811 A | 4/1994 | Fukatsu | 235/381 |
| 5,305,195 A | 4/1994 | Murphy | 364/401 |
| 5,309,355 A | 5/1994 | Lockwood | 364/401 |
| 5,353,218 A | 10/1994 | De Lapa et al. | 364/401 |
| 5,353,219 A | 10/1994 | Mueller et al. | 364/405 |
| 5,371,796 A | 12/1994 | Avarne | 380/23 |
| 5,380,991 A | 1/1995 | Valencia et al. | 235/383 |
| 5,398,932 A * | 3/1995 | Eberhardt et al. | 273/138 A |
| RE34,915 E | 4/1995 | Nichtberger et al. | 364/401 |
| 5,420,606 A | 5/1995 | Begum et al. | 345/156 |
| 5,459,306 A | 10/1995 | Stein et al. | 235/383 |
| 5,481,094 A | 1/1996 | Suda | 235/383 |
| 5,504,475 A | 4/1996 | Houdou et al. | 340/825.35 |
| 5,510,979 A | 4/1996 | Moderi et al. | 364/405 |
| 5,539,189 A | 7/1996 | Wilson | 235/379 |
| 5,564,546 A | 10/1996 | Molbak et al. | 194/216 |
| 5,572,653 A | 11/1996 | DeTemple et al. | 395/501 |
| 5,581,064 A | 12/1996 | Riley et al. | 235/383 |
| 5,592,375 A | 1/1997 | Salmon et al. | 395/207 |
| 5,592,376 A | 1/1997 | Hodroff | 395/214 |
| 5,602,377 A | 2/1997 | Beller et al. | 235/462 |
| 5,611,052 A | 3/1997 | Dykstra et al. | 395/238 |
| 5,612,868 A | 3/1997 | Off et al. | 364/214 |
| 5,615,269 A | 3/1997 | Micali | 380/49 |
| 5,619,558 A | 4/1997 | Jheeta | |
| 5,620,079 A | 4/1997 | Molbak | 194/217 |
| 5,621,201 A | 4/1997 | Langhans et al. | 235/380 |
| 5,621,640 A | 4/1997 | Burke | 395/214 |
| 5,621,812 A | 4/1997 | Deaton et al. | |
| 5,632,010 A | 5/1997 | Briechle et al. | 345/1 |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,655,007 A | 8/1997 | McAllister | |
| 5,664,115 A | 9/1997 | Fraser | 705/37 |
| 5,665,953 A | 9/1997 | Mazzamuto et al. | 235/383 |
| 5,724,886 A | 3/1998 | Ewald et al. | 99/374 |
| 5,832,457 A | 11/1998 | O'Brien et al. | |
| 5,845,259 A | 12/1998 | West et al. | |
| 5,890,718 A | 4/1999 | Byon | 273/459 |
| 5,946,665 A | 8/1999 | Suzuki et al. | 705/26 |
| 6,014,634 A | 1/2000 | Scroggie et al. | 705/14 |
| 6,267,670 B1 * | 7/2001 | Walker et al. | 463/17 |

OTHER PUBLICATIONS

"Industry Briefs", Card News, Phillips Business Information, Inc.; vol. 12, No. 11 (Jun. 9, 1997).

Myhre, James W., "Examiner's Affidavit", dated Feb. 22, 2001.

Brochure "NCR 7453 PC–Based Point–of–Sale Solution", NCR Corporation, Copyright 1998.

Brochure: "Reaching Out In New Directions", First Data Corporation, Merchant Services, undated.

"Cape Town", Reuters, Ltd, Nov. 8, 1979.

"Save the Mark", inancial Times (London), Feb. 1, 1983, Section I, Men & Matters, p. 12.

Cook, Louise, "ConsumerWatch: Clip, Snip, Save", The Associated Press, Mar. 12, 1984, Section: Business News.

Greene, Jan, "Farm bills please assns; National Grocers Association", Supermarket News, Dec. 23, 1985, Section: vol. 35, p. 6, ISSN: 0039–5803.

"POS spectrum: a lottery looks to POS for growth", POS News, Jan. 1989, vol. 5, No. 7, p. 8, ISSN: 0896–6230, CODEN: Bhorad.

Kuttner, Robert, "Computers May Turn The World Into One Big Commodities Pit", Business Week, Sep. 11, 1989, Section: Economic Viewpoint, No. 3123, p. 17.

Schrage, Michael, "An Experiment in Economic Theory; Labs Testing Real Markets", The Record, Nov. 26, 1989, Section: Business, p. B01.

"Let's Play the Cash Register Receipts Lottery", The New York Times, Dec. 25, 1990, Section 1, p. 30, Col. 4, Editorial Desk.

Del Rosso, Laura, "Marketel says it plans to launch air fair 'auction'in June; Marketel International Inc.", Travel Weekly, Apr. 29, 1991, Section: vol. 50, No. 34, p. 1, ISSN: 0041–2082.

"Philips offers customers financing through Citicorp", Health Industry Today, Jun. 1991, Section: vol. 54, No. 6, p. 4, ISSN : 0745–4678.

Pelline, Jeff, "Travelers Bidding On Airline Tickets SF firm offers chance for cut–rate fares", Aug. 19, 1991, Section: News, p. A4.

Del Rosso, Laura, "Ticket–bidding firm closes its doors; Marketel International", Travel Weekly, Mar. 12, 1992, Section: vol. 51, No. 21, p. 1, ISSN: 0041–2082.

"Coupons get serious; supermarkets use barcodes to prevent misredemptions", Chain Store Age Executive with Shopping Center Age; Oct. 1992, Section: vol. 68, No. 10, p. 68, ISSN: 0193–1199.

"Winn–Dixie/The Salvation Army Report Contributions For War Against Hunger", PR Newswire, Section: Financial News.

Jones, Jeanne, "Data Readers Streamline Management; Scanner Technology Aids Retailers As Well As Plants, Wholesalers", The Houston Post, Jun. 26, 1994, Section: Business, p. D1.

Fiorini, Phillip, "'No Place For Penny?' / Smallest coin doesn't make cents to some", USA Today, Jul. 29, 1994, Section: News: p. 1A.

Smith, Alison, "Survey of UK Consumer Credit and Asset Finance", Financial Times, Nov. 3, 1994, Section: p. VI.

Andreoli, Tom et al., "Cash Machines Offer a Whole Lotto Money for Withdrawal...", Crains Chicago Business, Jun. 19, 1995, Section: News, p. 8.

"Spain: BBV launches new card", Cards International, Jun. 22, 1995, Section: p. 5.

Knippenberg, Jim, "Psst! Will local radio empires strike back?", The Cincinnati Enquirer, Jul. 23, 1995, Section: Tempo, p. F01.

Brochure: "Cyber Bid", Net Fun Ltd, Copyright 1996.

Website: "NCR 7452 Workstation –Beyond Traditional POS", (http www ncr com/product/retail/products/catalog/7452 shtm), download date: Sep. 23, 1997.

McKinney, Jeff, "Merchant program could pay off for Provident", The Cincinnati Enquirer, Mar. 24, 1996, Section: Financial, p. E02.

Hadley, Kimberly, "Pastors praying anti–arson effort will burn bias", The Nashville Banner, Jul. 26, 1996, Section: News, p. A13.

Gapper, John, "NatWest reports rise in bad debt", Financial Times, Jul. 31, 1996, Section: News: UK, p. 09.

"Lynx Technology: Lynx to provide business leasing programme through Schroder Leasing", M2 Presswire, Aug. 9, 1996.

Taylor, Paul, "Towards a dream market", Financial Times (London), Sep. 4, 1996, Section: Survey –FT IT, p. 03.

Fickenscher, Lisa, "Amex to Start Free Rewards Program with Discounts on Merchandise", The American Banker, Oct. 18, 1996, Section: Credit/Debit/ATMs p. 10.

Fitzgerald, Kate, "Amex Program Moves Loyalty to Next Level...", Advertising Age, Nov. 4, 1996, Section: News, p. 2.

Bonnici, Joseph et al., "Consumer issues in coupon usage: An exploratory analysis", Journal of Applied Business Research, Winter 1996/1997, Section: vol. 13, No. 1, pp. 31–40, ISSN: 0892–7626, CODEN: JPBEBK.

Rehayem, Gilbert, "Opinion: X–Press Betting", La Fleur's Lottery World, Feb. 7, 1997.

Singletary, Michelle, "Electronic World, Unchecked Problem?...", The Washington Post, Mar. 4, 1997, Section: Financial, p. C01.

"Dispensing the future", Electronic Payments International, May 1997, Section: Feature: p. 12.

Hoeschen, Brad, "Brookfield Square hopes mall card strikes a chord", Business Journal–Milwaukee, Sep. 12, 1997, Section: vol. 14, No. 50, p. 19.

* cited by examiner

| DATE F1 | SALES RECEIPT NUMBER F2 | NUMBER OF TICKETS PURCHASED F3 | SALE AMOUNT F4 | LOTTERY TICKET NUMBERS F5 |
|---|---|---|---|---|
| 1/15/97 | 4532 | 1 | $1.00 | 01 12 34... |
| 1/15/97 | 4533 | 4 | $4.00 | 02 07 23...<br>01 17 46...<br>11 34 56...<br>22 33 44... |
| 1/15/97 | 4534 | 1 | $0.68 | 33 17 92... |

FIG. 5

| POS CONTROLLER ID NUMBER <u>F13</u> | POS CONTROLLER NAME <u>F14</u> | POS CONTROLLER LOCATION <u>F15</u> | TELEPHONE NUMBER <u>F16</u> |
|---|---|---|---|
| 23456 | MINI MART AND GROCERY | STAMFORD, CT 06905 | (203)555-1234 |
| | | | |
| | | | |

MINI-MART GROCERY STORE

| | |
|---|---|
| FRUIT | 2.50 |
| BEVERAGES | 15.00 |
| BREAD | 4.50 |
| VEGETABLES | 1.00 |
| DAIRY | 3.50 |
| CEREAL | 12.50 |
| STEAK | 35.00 |
| VEAL | 25.00 |
| LOTTERY TICKETS | 3.68 |
| TAX | 5.32 |
| TOTAL | $108.00 |

THANK YOU!

CONNECTICUT
L O T T E R Y

| | PRICE | |
|---|---|---|
| TICKET 1 | $1 | 01 10 20 30 36 39 |
| TICKET 2 | $1 | 11 21 24 25 32 33 |
| TICKET 3 | $1 | 07 09 11 13 15 17 |
| TICKET 4 | $0.68 | 08 13 15 16 27 41 |

STORE ID #: 23456
RECEIPT #: 3343
DATE: 1/15/97
TIME: 4:20 PM
PRICE: $3.68

CALL 1800-XXX-XXXX FOR INFORMATION REGARDING RESULTS, QUESTIONS, AND AUTHENTICATION

\*\*\*\*\*\*\*\* 5765685699 \*\*\*\*\*\*\*\*
4040545886
AUTHENTICATION CODE

FIG. 9

SYSTEM AND METHOD FOR PERFORMING LOTTERY TICKET TRANSACTIONS UTILIZING POINT-OF-SALE TERMINALS

CROSS-REFERENCE TO RELATED APPLICATION

This application is a continuation of U.S. patent application Ser. No. 08/822,709 filed Mar. 21, 1997, now U.S. Pat. No. 6,267,670 incorporated herein by reference.

BACKGROUND OF THE INVENTION

This invention relates to a lottery ticket transaction system. More particularly, the present invention relates to a system and a method for selling lottery tickets using point-of-sale ("POS") terminals that generate sales receipts containing both merchandise sales information and lottery ticket information.

Many states in the United States., as well as some foreign countries, have government-conducted lottery systems. Government-conducted lotteries offer the public a desirable product (usually the chance to win a large cash prize), and have the benefit of increasing governmental revenues without burdening the public with additional or increased taxes. In many instances, the revenue generated from a governmental lottery is dedicated to a particular purpose or goal, such as improving the education system or reducing property taxes.

In a typical government-conducted lottery system, a central lottery computer is used to communicate with dedicated lottery terminals. A player selects numbers on a lottery playslip, and the lottery terminal operator inserts the lottery playslip into a reader at the lottery terminal, which optically reads the lottery playslip using a known mark-sense process. The dedicated lottery terminal then communicates the player's selected numbers. to a central lottery computer which in turn stores them. After the lottery numbers have been stored, the dedicated lottery terminal, under the control of the central lottery computer, prints and issues the lottery ticket.

One popular lottery game, known as "lotto," typically requires the player to choose six numbers from one to forty-two. The selected group of numbers are then compared to the winning lottery numbers, which have been randomly selected from the larger pool of numbers, from one to forty-two, at some specified time and date after purchase of the lotto ticket, usually once or twice each week. To win a prize, the lotto ticket numbers must be equal to all or some of the winning lottery numbers.

While players may select their own lottery numbers, most lotto games provide the option of having. the central lottery computer system select random "quick-pick" lottery numbers instead. This saves the purchaser the time and inconvenience of picking his or her own numbers. These automatic lottery number generation systems are usually known as "quick-pick" systems.

A variety of games may be played in a typical lottery. In conventional lottery games, a player purchases a lottery ticket. Inscribed on that lottery ticket are one[]or more lottery numbers and a serial number. The serial number functions as a simple method of fraud prevention, because it uniquely identifies each lottery ticket sold. The lottery number also allows both the player and the lottery system to identify a winner;. specifically, the lottery numbers are compared by the player to a "winning number list", to determine if the player has won a prize.

There are also instant lottery games in which the outcome is determined prior to the sale of the lottery ticket. By uncovering concealed indicia inscribed on the lottery ticket, the player can determine if the lottery ticket is a winner —immediately after purchase.

Some foreign countries (e.g. Germany) allow a lottery. player to purchase fractional lottery tickets. However, these lottery systems only allow the player to purchase fixed fractions of certain high-priced lottery tickets (e.g., a half, or quarter share of a lottery ticket). In these instances, if the lottery ticket is a winner, the purchaser will only receive one-half or one-quarter of the full prize amount.

The majority of lottery tickets are sold by grocery, liquor and convenience stores. These retail stores typically place the dedicated lottery terminal away from one or more POS terminals used for merchandise transactions. This physical separation is to ensure that the merchandise transaction line is not slowed-down or blocked by customers wishing to make lottery ticket purchases. In addition, since the lottery terminals have a separate and distinct accounting system,. there is no need to co-locate the POS terminals and dedicated lottery terminals.

However, some customers may consider it annoying to make two separate transactions, i.e., merchandise and lottery tickets, on two different terminals within the -same store. Separate terminals may also force the customers to wait in two separate lines, or may slow down the overall merchandise check-out procedure while a single store clerk performs two separate transactions on two terminals. Besides annoying the merchandise-only customers, these inconveniences also reduce the impulse purchasing of lottery tickets, which in turn leads to loss of revenue for the government and the store.

There are other disadvantages with using two-separate and distinct terminals for merchandise transactions and lottery ticket transactions. The government usually bears the costs of purchasing, leasing, installing and maintaining the dedicated lottery terminals. There are also the considerable costs of resupplying the lottery ticket paper and ink for each dedicated lottery terminal. Moreover, many retail stores with multiple checkout lines and registers, such as supermarkets, do not have the resources to support dedicated lottery terminals at every check-out register. In addition, a dedicated lottery terminal uses counter space that could otherwise be devoted to revenue-producing merchandise displays. It is also costly to train store personnel in the operation of two distinct types of transaction terminals. These factors reduce the availability of lottery tickets to consumers, and thus reduce governmental revenue, by limiting the number of locations that sell lottery tickets.

After many years of steadily increasing profits, many state-run lotteries have seen a downturn in profits. Improving the ease of purchasing lottery tickets and increasing their availability has become a primary concern as many states are modernizing their lottery systems. The current lottery system does not allow for the sale of fractional value lottery tickets at retail point of sale terminals. There is a significant loss of revenue from this lost opportunity to buy fractional value lottery tickets. Accordingly, there is a need for a system that solves the above described problems.

SUMMARY OF THE INVENTION

The present invention solves the foregoing problems by providing a system and a method for performing integrated lottery ticket and merchandise transactions. The system and method utilizes POS terminals that generate a single sales receipt containing all lottery ticket and merchandise information.

In accordance with one embodiment of the present invention, each POS terminal is connected to a POS controller, which in turn is adapted to communicate with a lottery data processing system. The POS terminal is designed to perform lottery transactions in addition to merchandise transactions. Accordingly, during the course of purchasing merchandise, the buyer can also request the purchase of a lottery ticket. The POS terminal operator thereupon actuates a pre-programmed key or other coded input on the POS terminal, which causes the terminal to transmit a lottery ticket request to the POS controller. The controller transmits this request to the lottery data processing system, which carries out the lottery transaction. The lottery data processing system then transmits lottery ticket information back to the POS terminal. The POS terminal completes the transaction by printing out a single sales receipt containing both lottery ticket information and information concerning the merchandise being purchased.

The present invention advantageously eliminates the need for a separate lottery ticket system and terminal which in turn eliminates the added costs of the check-out counter space associated therewith. This provides the lottery ticket purchaser with a convenient and efficient means of buying lottery tickets while making non-lottery ticket purchases at the POS terminal. The present invention also advantageously provides the consumer greater access to lottery tickets by increasing the number of locations capable of selling lottery tickets.

In accordance with another embodiment of the present invention, lottery players may purchase fractional lottery tickets at the POS terminal. Any fraction or percentage of a full lottery ticket can be requested by the customer (i.e. one to ninety-nine percent). The customer is not limited to any preset or fixed fractions. This is advantageous for customers who are making other merchandise transactions and who do not wish to receive change (coins totalling less than a dollar). Instead of receiving a handful of change, the customer can request his change be used for purchasing a fractional lottery ticket. In this embodiment, the lottery player would only receive a fraction of a winning prize based on the fraction of the lottery ticket purchased.

In accordance with another embodiment of the present invention, lottery players may telephone the lottery data processing system via an interactive voice response unit (IVRU) to verify the validity of the lottery ticket information. The player inputs to the IVRU via the telephone keypad the encrypted authentication code printed on the sales receipt, and this code is decrypted by the lottery data processing system and used to verify the lottery ticket.

BRIEF DESCRIPTION OF THE DRAWINGS

FIG. 5 is a table depicting the local lottery ticket database within the POS controller of FIG. 3.

FIG. 7 is a table depicting the POS controller database within the lottery data processing system of FIG. 4.

FIG. 9 is an example of a store sales receipt in accordance with the preferred embodiment of the present invention.

DETAILED DESCRIPTION OF THE PREFERRED EMBODIMENTS

The present invention is directed to a system for performing lottery ticket transactions at retail POS terminals without the customer having to wait for two transaction receipts, or go to another check-out terminal to make other non-lottery ticket purchases. In about the same amount of time it takes to ring up bread or milk at a POS terminal, the customer can also purchase a "quick-pick" lottery ticket. This one-stop shopping facilitates the sale of lottery tickets, and speeds the customer on his way. In addition, the present invention enables the customer to purchase fractionallottery tickets which even further facilitates the sale of lottery tickets. In particular, in cases where a customer makes other merchandise purchases, instead of receiving change, he can request a fractional lottery ticket (equal to the change amount). Accordingly, the present invention provides a consumer with a convenient and efficient system to purchase lottery tickets.

The term "quick-pick" refers to a lottery ticket in which the lottery numbers are randomly generated for the customer by the lottery system.

A fractional lottery ticket is a lottery ticket in which the customer will receive only a portion of the winning prize in accordance with the fractional portion paid for the ticket as compared to the full price of a lottery ticket. For example, if a customer pays 58 cents for a fractional lottery ticket where the full price of a lottery ticket is a dollar, the customer would receive fifty-eight percent of the prize amount if the ticket is a winner. As used herein, the term "lottery tickets", or equivalents thereof includes fractional lottery tickets.

Figure 1:
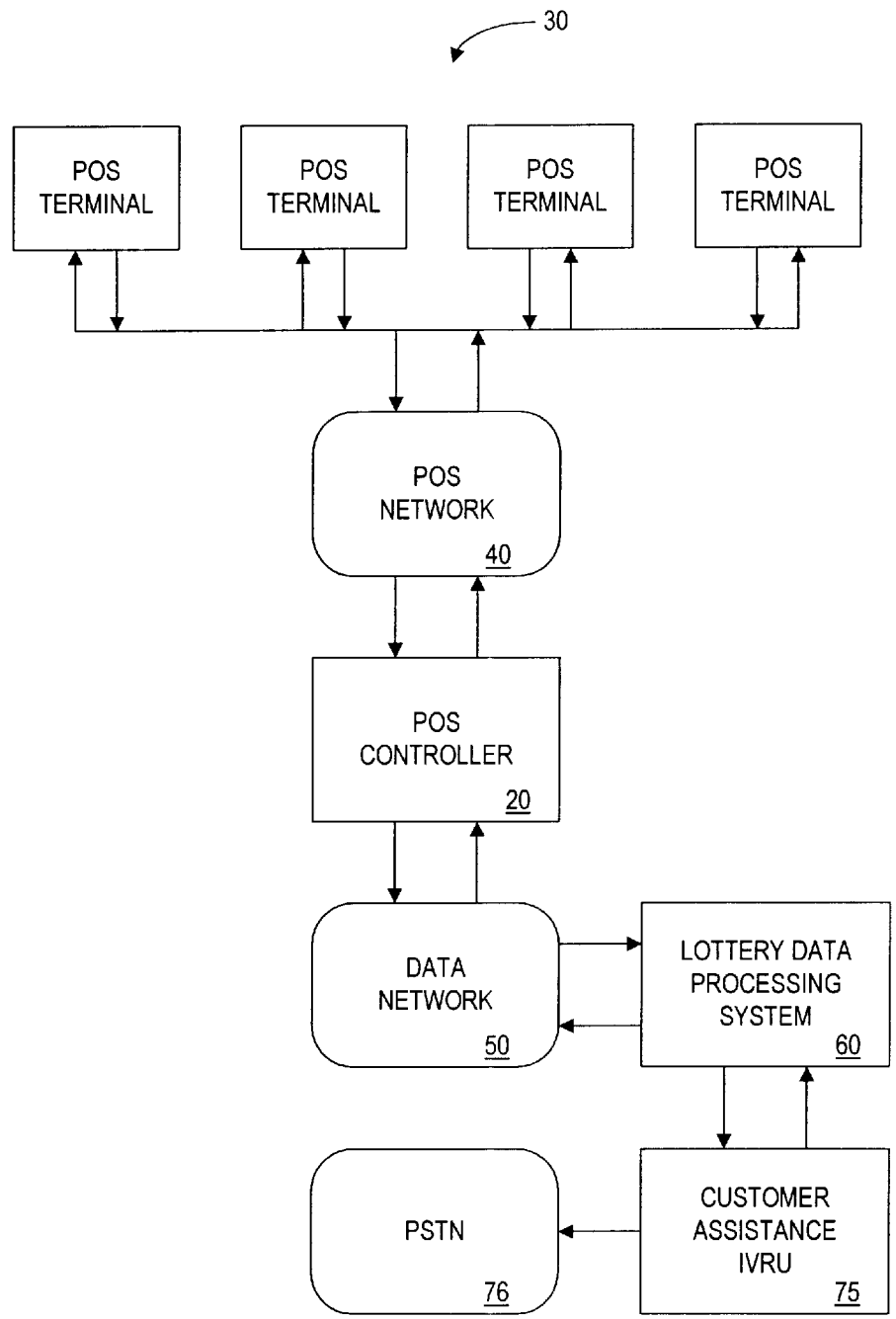
FIG. 1 is a block diagram of a system in accordance with the present invention.

FIG. 1 shows an overall system block diagram of a preferred embodiment of the present invention. In this embodiment, a POS controller 20 is linked to at least one POS terminal 30 via a POS network 40. Four POS terminals 30 are depicted in FIG. 1, but any number of POS terminals 30 can be used. The POS network 40 does not have to be a hard wired network, it can include any of a wide variety of means suitable to transmit and receive data communications, as described below. A lottery ticket transaction can be initiated from any one of the POS terminals 30. The information required to initiate a lottery ticket transaction is passed between the POS terminal 30 and the POS controller 20 via the POS network 40. It is understood that other types of information can also be passed between the POS terminal 30 and the POS controller 20. For example, merchandise prices, coupon discounts, and sales event information can also be passed between the POS terminal 30 and the POS controller 20.

As illustrated in FIG. 1, the POS controller 20 is also linked to a lottery data processing system 60, discussed in detail below, via a data network 50. The data network 50 can be any one or more of a variety of networks capable of data communications. For example, the data network 50 can be a public switched telephone network 76 (PSTN), an integrated service digital network (ISDN), a packet switched network, a private data communication network, a wireless network or any other suitable network.

The POS terminals 30 and the POS controller 20 depicted in FIG. 1 may be embodied in hardware specifically provided to implement the present invention. Alternatively, they may be implemented using existing cash registers and central in-store servers. In particular, many retail stores have computerized cash registers which are coupled to an in-store transaction processor to receive and transmit merchandise price and other merchandise information. The hardware of these systems may be used for the present invention. To incorporate the present invention changes to the existing in store transaction processor or store network server may be accomplished in various ways, such as reprogramming the existing in-store transaction processor or by adding an additional file server.

Figure 2:
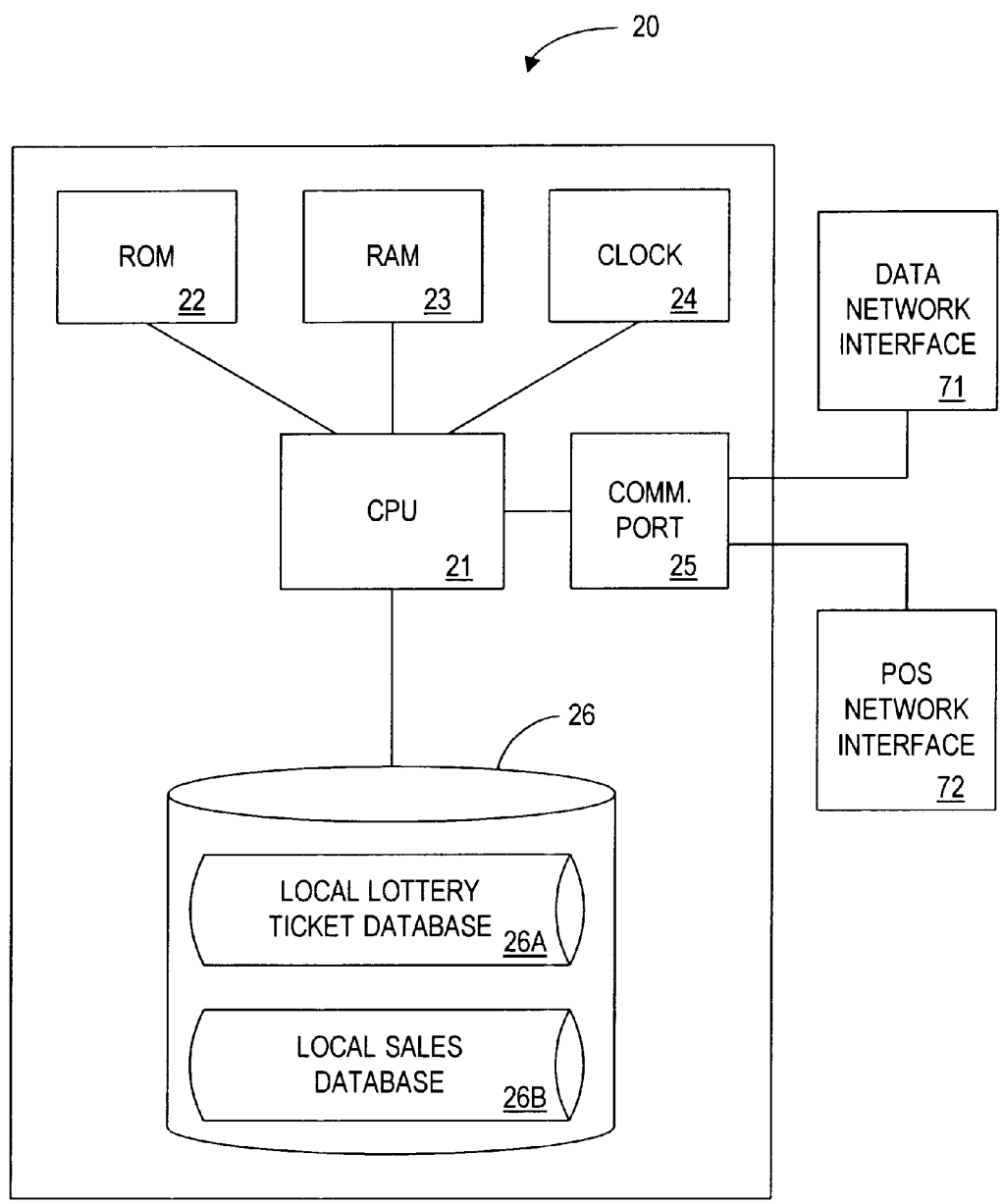
FIG. 2 is a block diagram of the POS controller of FIG. 1.

FIG. 2 is a block diagram of the POS controller 20. The POS controller 20 includes a CPU 21 which performs the processing functions. POS controller 20 also includes a read only memory 22 (ROM) and a random access memory 23 (RAM). The ROM 22 is used to store at least some of the program instructions that are to be executed by the CPU 21, such as portions of the operating system or basic input-output system (BIOS), and the RAM 23 is used for temporary storage of data. A clock circuit 24 provides a clock signal which is required by the CPU 21.

The POS controller 20 also includes a communication port 25 connected to a data network interface 71 and a POS network interface 72. The communication port 25 enables the CPU 21 to communicate with devices external to the POS controller 20. In particular, the communication port 25 permits communication with the POS terminals 30 and also with the lottery data processing system 60. While a modem (not shown) and a dedicated telephone line for establishing communication with the lottery data processing system 60 is preferred, other data network interfaces, including an ISDN terminal to interface with an ISDN network, a radio communications interface, and an Internet interface, may be used as well.

The CPU 21 can also store information to, and read information from, a data storage device 26. The data storage device 26 includes a local lottery ticket database 26a and other databases including a local sales database 26b that a store may conventionally maintain. The local lottery ticket database 26a is described below. In addition, the data storage device 26 includes instructions which can be read by and executed by the CPU 21, thereby enabling the CPU 21 to process transactions. While FIG. 2 depicts separate databases, a single database that incorporates both functions can also be used. Additional databases may be added as needed to store a variety of other information that may be required for other purposes.

FIG. 5 is a pictorial representation depicting the preferred layout and the information stored in the local lottery ticket database 26a. The local lottery ticket database 26a includes a date field F1, a sales receipt number field F2, a number of tickets purchased field F3, a sale amount field F4, and a lottery ticket number field F5. In the case of a fractional lottery ticket, the sale amount field F4 would contain the fractional amount of the lottery ticket purchased by the customer (e.g., sixty-eight cents).

While only three records R1 for three lottery ticket transactions are depicted in FIG. 5, any number of records may be stored. To conserve storage space on the data storage device 26, records may be transferred to a different storage device or deleted after some predetermined time interval or after a predetermined event (e.g. after the winning lottery number drawing).

Figure 3:
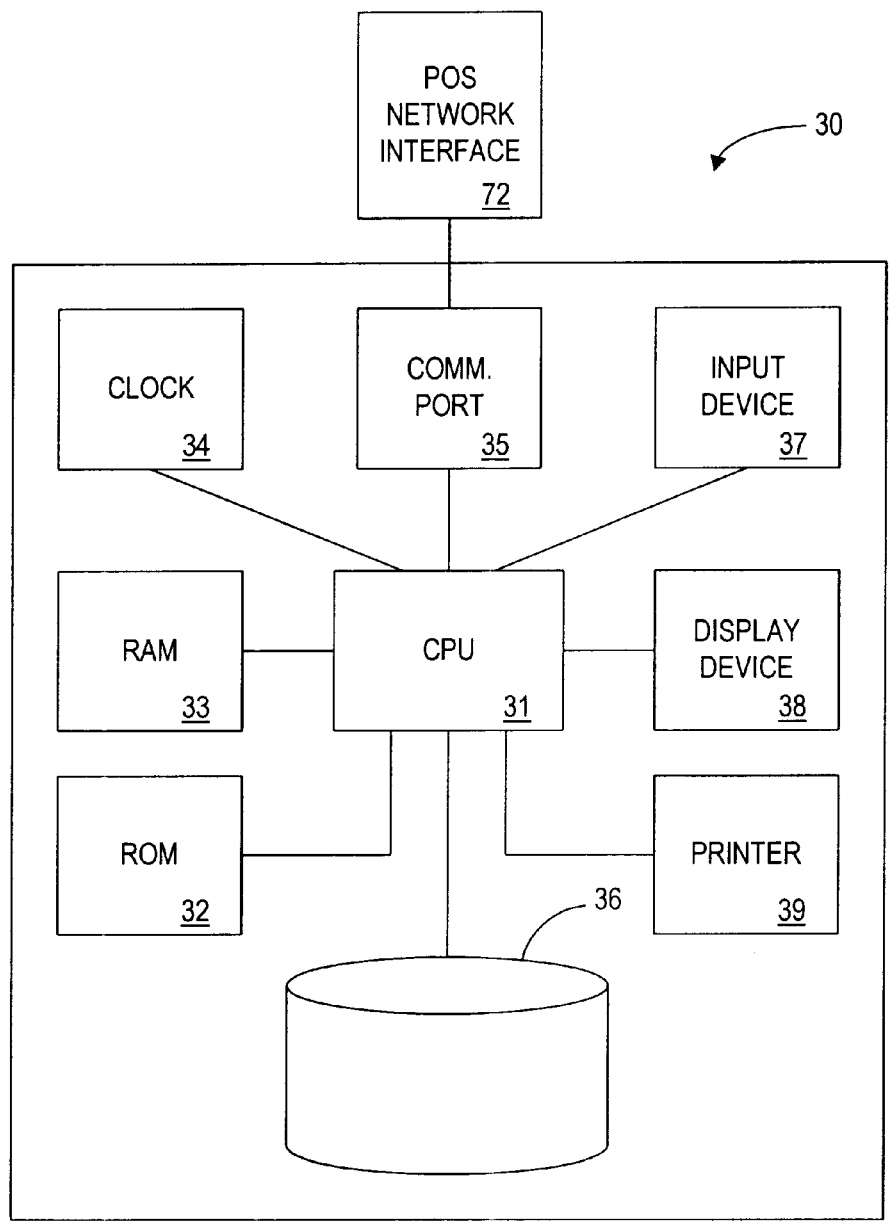
FIG. 3 is a block diagram of the POS terminal of FIG. 1.

FIG. 3 is a block diagram of the preferred POS terminal 30, which can be located at a supermarket, grocery store, liquor store or any other location where consumer transactions are performed. As previously discussed above, there can be any number of POS terminals 30,linked to one POS controller 20. The POS terminal 30 includes a CPU 31, ROM 32, RAM 33, clock circuit 34, communication port 35 and a data storage device 36. The communication port 35 interfaces with the POS network 40 which facilitates communication between the POS terminal 30 and the POS controller 20.

The POS terminal 30 includes an input device 37 to receive input from, an operator. Any one of a variety of input devices would be suitable for this purpose, including, for example, depression-actuated buttons, keys, membranes, a mouse, touchscreens, bar code scanners, and the like. The input device 37 may interface directly with the CPU 31, as shown in FIG. 3. Alternatively, an appropriate interface circuit may be placed between the CPU 31 and the input device 37.

The POS terminal 30 also includes a display device 38 for conveying information to the operator, customer or both. Any one of a variety of display devices would be suitable for this purpose, including, for example a CRT, LCD, LED or thin film transistor panel.

The POS terminal 30 also includes a display device 38 for in which transaction processor instructions are stored. These instructions can be read by and executed by the CPU 31, enabling the POS terminal 30 to process a variety of transaction types. By way of example,these transaction types may include "quick-pick" lottery tickets, lottery tickets other than "quick-pick" tickets and merchandise transactions.

The POS terminal 30 further includes a printer 39 for recording the transaction performed by the POS terminal 30. The printer 39 may interface directly with the CPU 31, as shown in FIG. 3. Alternatively, an appropriate interface circuit may be placed between the CPU 31 and the printer 39.

It will also be understood that other combinations of POS controllers 20 and POS terminals 30 could be employed, depending upon the requirements of a particular establishment. In particular, the POS terminal 30 may incorporate some of the features of the POS controller 20 so that the integrated POS terminal/controller can function as a stand-alone unit. This type of terminal would be advantageous for establishments that only require a single POS terminal.

Figure 4:
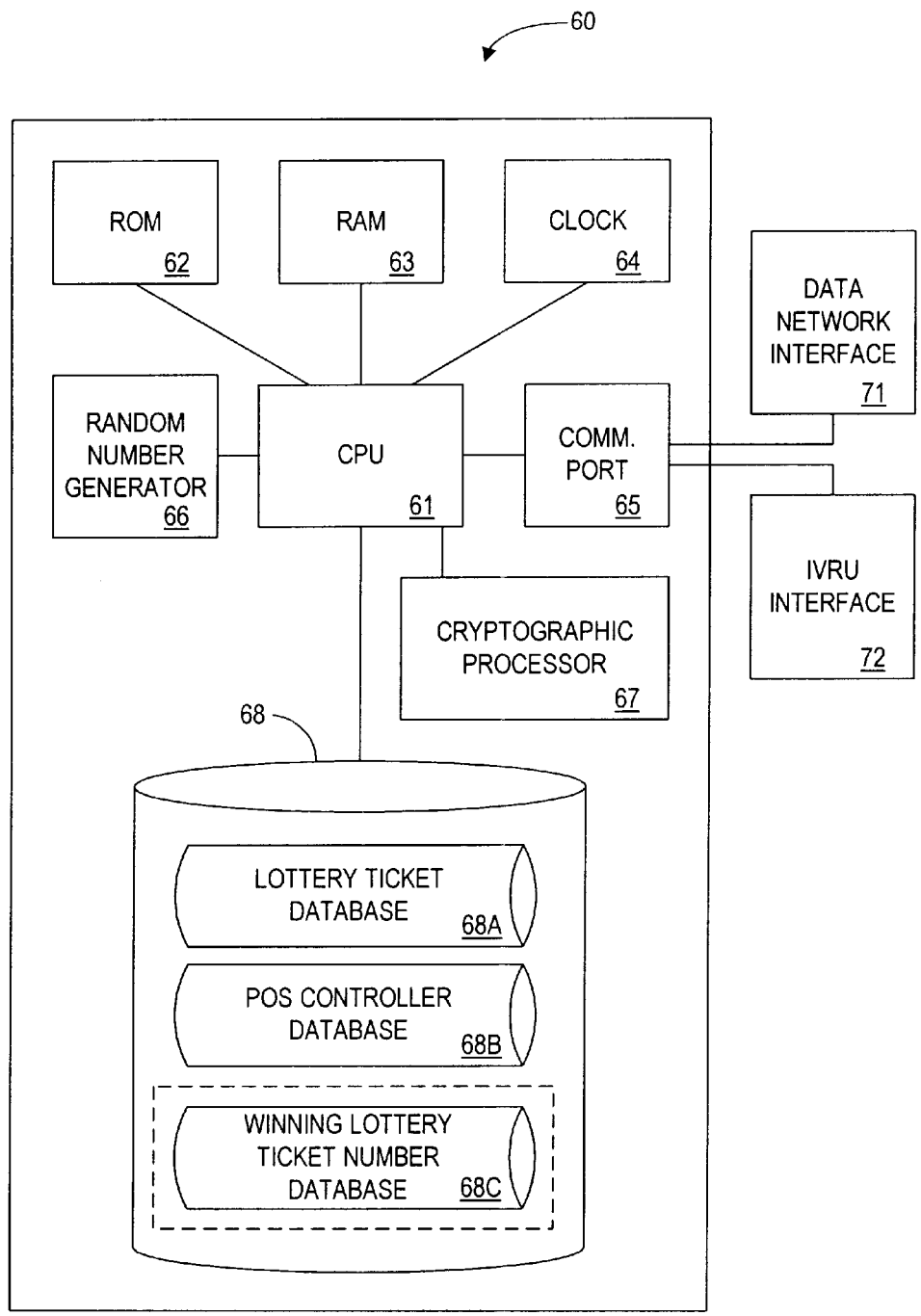
FIG. 4 is a block diagram of the lottery data processing system.

Shown in FIG. 4 is a block diagram of the lottery data processing system 60. Like the POS controller 20 described above, the lottery data processing system 60 includes a CPU 61, ROM 62, RAM 63, a clock circuit 64, and a communication port 65. The communication port 65 is connected to the data network interface 71. The data network interface 71 depicted is equivalent to the data network interface in FIG. 2. One POS controller 20 is depicted in FIG. 1, but any number of POS controllers 20 can be linked to the lottery data processing system 60 via the data network 50 and the data network interface 71.

As shown in FIG. 4, the communication port 65 is also connected to an IVRU interface 74. A customer assistance IVRU 75, as shown in FIG. 1, is linked to the lottery data processing system 60 via the IVRU interface 74. The customer assistance IVRU 75 is also connected to the PSTN 76, the public switched telephone network. The customer assistance IVRU 75 allows a caller (not shown) to communicate with the lottery data processing system 60 using a telephone (not shown). Voice command prompts guide the caller through various menu options allowing the caller to input and extract data related to a particular lottery ticket transaction. This process is described in greater detail below.

The CPU 61 can also store information to, and read information from the data storage device 68. The data storage device 68 includes a lottery ticket database 68a, a POS controller database 68b, and a winning lottery ticket number database 68c which are described below. In addition, the data storage device 68 includes instructions which can be read by and executed by the CPU 61, thereby enabling the CPU 61 to process lottery transactions. While FIG. 4 depicts separate databases, a single database that incorporates all the functions of databases 68a, 68b and 68c can also be used. Additional databases may be added as needed to store a variety of other information that may be useful in maintaining and administrating a lottery system.

The lottery data processing system 60 also includes a random number generator 66 and a cryptographic processor 67. When requested by the CPU 61, the random number generator 66 generates the random "quick-pick" numbers used for "quick-pick" lottery ticket transactions. The cryptographic processor 67 is used to encrypt an authentication code generated by the CPU 61, described in greater detail below. This encrypted authentication code is passed to the CPU 61 which associates it with a particular lottery transaction. The cryptographic processor 67 is also used to decrypt encrypted authentication codes which are passed to it by the CPU 61.

While the illustrated embodiment depicts the random number generator 66 and the cryptographic processor 67 as separate elements within the lottery data processing system 60, it should be understood that other methods of performing their functions may be used. For example, these functions may be implemented in a computer program stored in the data storage device 68 and executed by the CPU 61.

Figure 6:
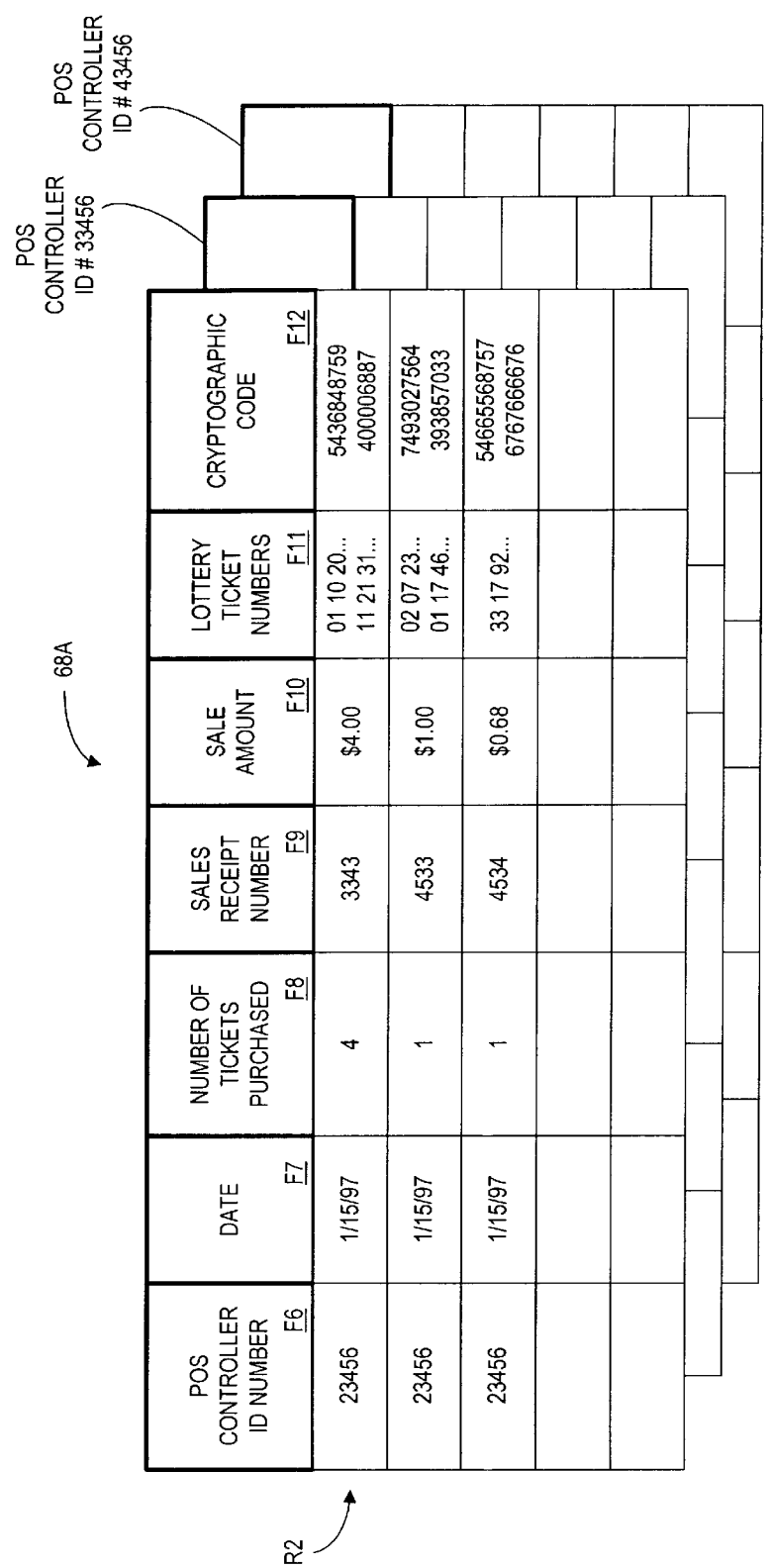
FIG. 6 is a table depicting the lottery ticket database within the lottery data processing system of FIG. 4.

FIG. 6 is a pictorial representation of the information stored in the lottery ticket database 68a. The lottery ticket database 68a includes a POS controller ID number field F6, a date field F7, a number of tickets purchased field F8, a sales receipt number field F9, a sale amount field F10, a lottery ticket numbers field F11, and a cryptographic code field F12. In the case of a fractional lottery ticket, the sale amount field F10 would contain the fractional amount of the lottery ticket purchased by the customer (e.g., sixty-eight cents). The POS controller ID number field F6 is a unique code corresponding to each POS controller 20 that communicates with the lottery data processing system 60. The sales receipt number field F9 stores a serial number related to each receipt generated by the POS terminals 30. The cryptographic code field F12 stores the encrypted authentication code, as discussed in detail below.

While record R2 for one POS controller with ID number 23456 is depicted in FIG. 6, any number of records may be stored. As is also the case with the data storage device 26, from time to time records may be transferred to a different storage device or deleted to conserve'storage space within the data storage device 68. The winning lottery ticket number database 68c is one of the other databases that the lottery data processing system conventionally maintains.

FIG. 7 is a pictorial representation depicting the information stored in the POS controller database 68b. The POS controller database 68b includes a POS controller ID number field F13, a POS controller name field F14, a POS controller location field F15, and a telephone number field F16. The POS controller name field F14 stores the name of the store or establishment where the POS controller 20 is located. The PQS controller location field F15 stores the address of where the POS controller 20 is located. The telephone number field F16 stores the telephone number associated with each POS controller 20. A record R3 for one POS controller location is depicted in FIG. 7, but any number of records may be stored.

It should be understood that some fields within the databases discussed above would contain the same corresponding information (e.g. POS controller ID number field F6 in the lottery ticket database 68A corresponds to field F13 in the POS controller database 68B).

Figure 8:
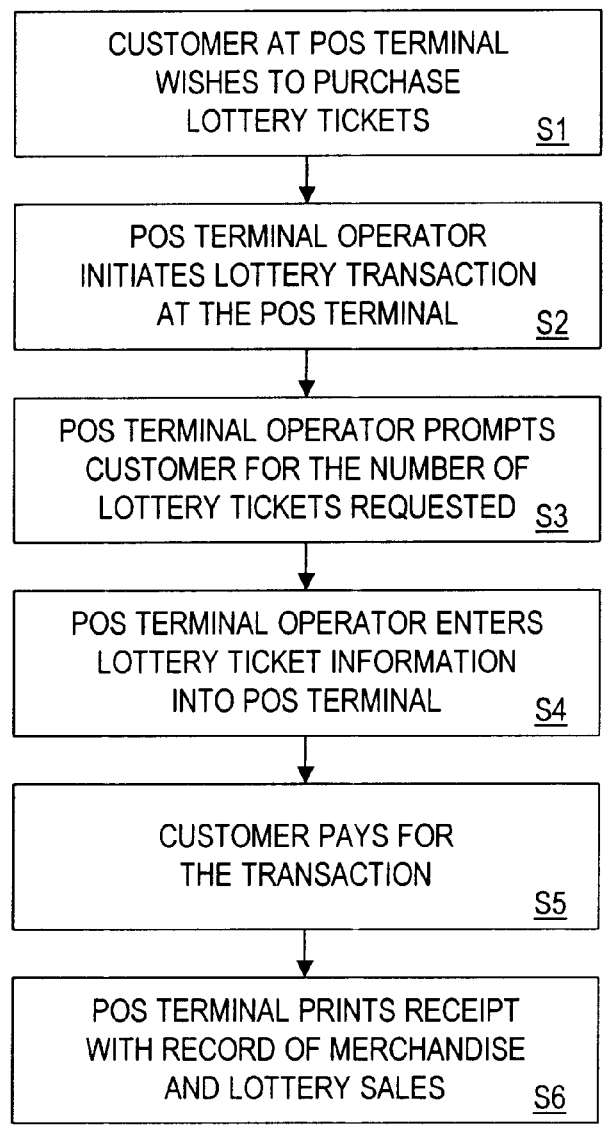
FIG. 8 is a flow chart depicting the lottery transaction at the POS terminal.

FIG. 8 is a flow chart depicting an exemplary lottery ticket transaction process performed at the POS terminal 30 from the customer's point of view. The process starts when a customer indicates to the POS terminal operator that he or she wishes to purchase one or more "quick-pick" lottery tickets in step Sl. Of course, the "quick-pick" lottery tickets can be either full or fractional lottery tickets. The customer may make this decision to buy lottery tickets as a stand-alone transaction or while purchasing other merchandise, such as milk or bread. In step S2, the POS terminal operator initiates a lottery transaction by actuating a pre-programmed designation on the input device 37 associated with the POS terminal 30. The customer is then prompted by the POS operator for the number of "quick-pick" lottery tickets desired in step S3.

The number of "quick-pick" lottery tickets may also include fractional lottery tickets. This is convenient for customers who do not want to receive a handful of coins as change from a transaction. For example, a customer due sixty-eight cents in change, from a merchandise purchase could elect to buy a lottery ticket for sixty-eight cents which is worth 68% of a $1 ticket and which pays-out sixty-eight percent of the $1 payout. Alternatively, the customer could buy a 34% value of a $2 ticket with 68 cents. Along with the fractional value lottery tickets, the customer may of course purchase full value lottery tickets.

In an alternative embodiment, the customer may also be prompted for additional lottery ticket information, such as the type of lottery game to be played and the particular lottery numbers selected by the customer. For example, a particular lottery system may offer lottery games based on three, four and six number combinations. The customer may also personally select the lottery numbers to be played.

In step S4, the POS terminal operator enters the number of lottery tickets requested by the customer into the POS terminal 30 via the input device 37. The customer pays for the lottery tickets and any other purchases made at this time in step S5. In step S6, the POS terminal prints a single receipt containing the lottery ticket information and any other merchandise sales information.

Shown in FIG. 9 is an example of a store sales receipt 80 according to one embodiment of the present invention. The store sales receipt 80 includes non-lottery ticket related merchandise information 81. The bottom portion contains lottery ticket information including a plurality of lottery numbers 82, a store ID number 83, a receipt number 84, a date 85, a time 86, a price 89, a lottery telephone number 87, and an encrypted authentication code 88. In the case of a fractional lottery ticket, the store sales receipt 80 would also include an indication of the fraction of the full price lottery ticket purchased (e.g., as shown in FIG. 9, $0.68 was paid for ticket 4).

Figure 10:
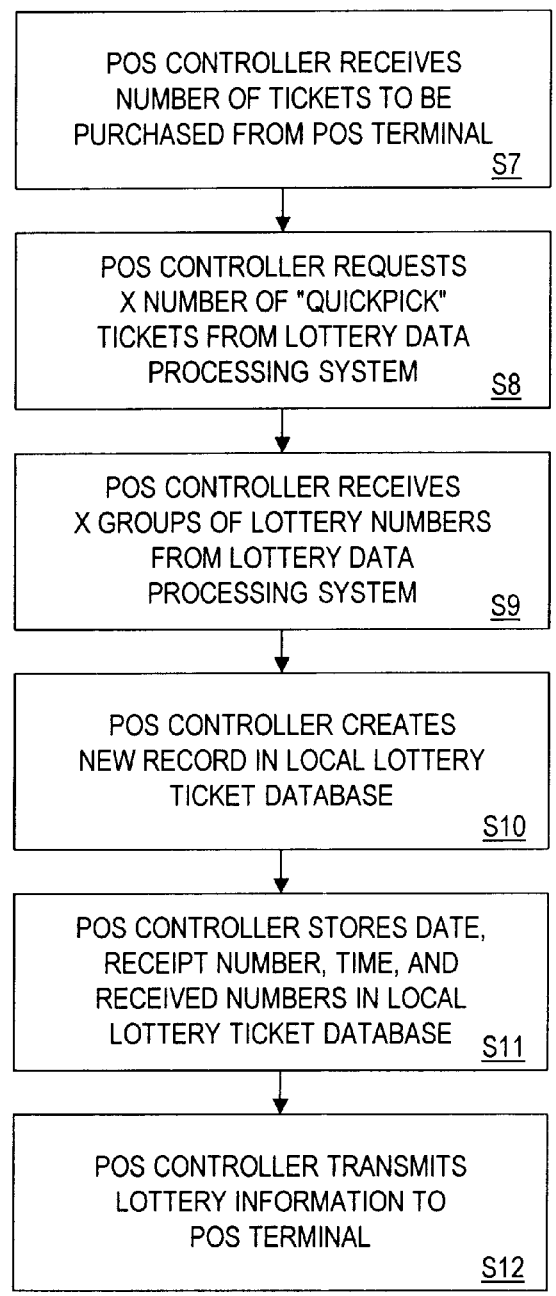
FIG. 10 is a flow chart of the operation of the POS controller.

FIG. 10 is a flow chart of an exemplary operation of the POS controller 20. The steps of the process shown in FIG. 10 may be implemented in a computer program that may be installed at the POS controller 20 from a computer readable medium and then stored therein in one or more of the ROM 22, the RAM 23 and the data storage device 26 (shown in FIG. 2). The POS controller 20 receives in step S7 a lottery ticket transaction request which includes, in this example, the number of "quick-pick" lottery tickets requested by the customer from the POS terminal 30. The POS controller 20 temporarily stores this information in RAM 23, while it establishes a real-time communication link with the lottery data processing system 60 via the data network 50.

While one lottery data processing system 60 is depicted in FIG. 1, additional lottery data processing systems may be available as secondary or back-up lottery data processing systems. Accordingly, if the POS controller 20 fails to establish communication with the primary lottery data processing system, communication attempts would be made to a secondary lottery data processing system.

Once the real-time communication link is established, the POS controller 20 in step S8 transmits the number of "quick-pick" lottery tickets requested to the lottery data processing system 60. The POS controller 20 also transmits its POS controller identification number (e.g. F1 in FIG. 7). In step S9, the POS controller 20 receives one or more groups of lottery numbers (corresponding to the number of lottery tickets requested) and an associated encrypted authentication code from the lottery data processing system 60. A new record (e.g. R1 in FIG. 5) is created in the local lottery ticket database (26a in FIG. 2) in step S10. In step S11, the POS controller 20 stores in the newly created record the date, receipt number, time, and lottery numbers received from the lottery data processing system (as shown in FIG. 5, F1–F5). The POS controller 20 then transmits the lottery ticket information (i.e. the lottery numbers and the encrypted authentication code) to the POS terminal 30 that initiated the lottery transaction request in step S12.

Each of the steps S7-S12 described above is executed by the CPU 21 which is executing computer program instructions stored in the data storage device 26. The communication with the POS terminal 30 takes place via the communication port 25 and the POS network interface 72. The communication with the lottery data processing system 60 takes place via the communication port 25 and the data network interface-71.

In an alternative embodiment, the POS controller 20 may also handle non-"quick-pick" lottery ticket transactions. Customer-selected lottery numbers would be received from the customer via mark-sense slips or coded chits at the POS terminal 30 and sent to the lottery data processing system 60 for processing, as described below.

Figure 11:
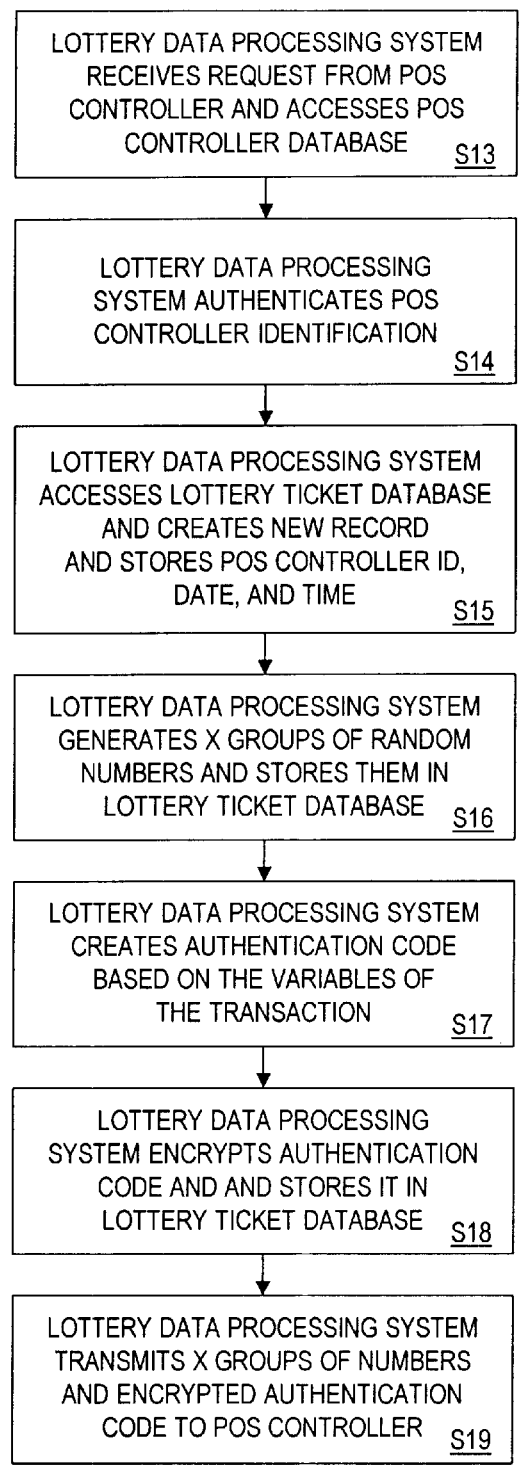
FIG. 11 is a flow chart of the operation of the lottery data processing system.

FIG. 11 is a flow chart of the operation of the lottery data processing system 60. The steps of this process may be stored on a computer readable medium which in this case would be the data storage device 68 (shown in FIG. 4). Upon receiving the lottery ticket transaction request and the POS controller identification number from the POS controller 20, the lottery data processing system 60 instep S13 accesses the POS controller database 68b (shown in FIGS. 4 and 7). The lottery data processing system 60 searches the POS controller database 68b and authenticates the POS controller identification number, as shown in step S14. In step S15, the lottery ticket database 68a (shown in FIGS. 4 and 6) is accessed and a new lottery transaction entry is added in the appropriate POS controller record (e.g. R2 in FIG. 6).

In step S16, the lottery data processing system 60 generates one or more groups of random "quick-pick" lottery numbers using the random number generator 66 (shown in FIG. 4). These random "quick-pick" lottery numbers are used for the quick-pick lottery tickets. The lottery transaction entry added in step S15 is then updated in step S16 by storing these random "quick-pick" lottery numbers in the designated field of the record.

The lottery data processing system 60 also generates an authentication code based on the variables of the particular lottery transaction in step S17. This authentication code is a numeric string including all the data of one record in the lottery ticket database 68a. An example of such a code corresponding to the first entry shown in FIG. 6, R2, is as follows:

23456/011597004/3343004/011020112131

In this example, 23456 represents; the POS controller ID number; 011597 represents the date; 004 represents the number of tickets purchased; 3343 represents the sales receipt number; 004 represents the sales amount; and 011020112131 represents the lottery ticket numbers.

While the use of an encrypted authentication code is the preferred embodiment, it should also be understood that the store sales receipt number along with the date for each transaction may be used instead. In this situation, the sales receipt number and the date would be used as a pointer to the lottery ticket database 68a. This pointer would be used to extract and verify lottery ticket information as required.

In step S18, using the cryptographic processor 67 (shown in FIG. 4), the authentication code is encrypted to produce a unique numeric code. The lottery transaction entry added in step S15 is then updated again by storing the encrypted authentication code in the appropriate field of the record (see FIG. 6). The use of cryptographic processors and encryption algorithms are well known to those skilled in the art of cryptography. For reference, one of ordinary skill in the art may refer to Bruce Schneier, Applied Cryptography, Protocols, Algorithms and Source Code in C, (2nd Edition, John Wiley & Sons, Inc., 1996).

The lottery data processing system 60 then transmits the lottery ticket numbers and the encrypted authentication code to the POS controller 20 initiating the lottery ticket transaction in step S19.

This authentication code provides an added level of security and protection for the purchase of: the lottery ticket. Should the database within the lottery data processing system 60 be corrupted, all the information printed on the store receipt lottery ticket can still be verified by any other device capable of decrypting the authentication code.

Each of the steps S13–S19 described above is executed by the CPU 61, which carries out these steps by executing computer program instructions stored in the data storage device 68. The communication with the POS controller 20 takes place via the communication port 65 and the data network interface 71.

In an alternative embodiment, additional information may be transmitted from the POS controller 20 to the lottery data processing system 60. This could include, as described above, customer-selected lottery numbers instead of the random "quick-pick" lottery numbers generated by the lottery data processing system 60. In this situation, the lottery data processing system 60 would store the customer-selected lottery numbers in the lottery ticket database 68a. An encrypted authentication code would be generated accordingly based on the customer-selected lottery numbers. The lottery data processing system 60 would then send the encrypted authentication code and authorization to complete the lottery transaction to the POS controller 20.

Figure 12:
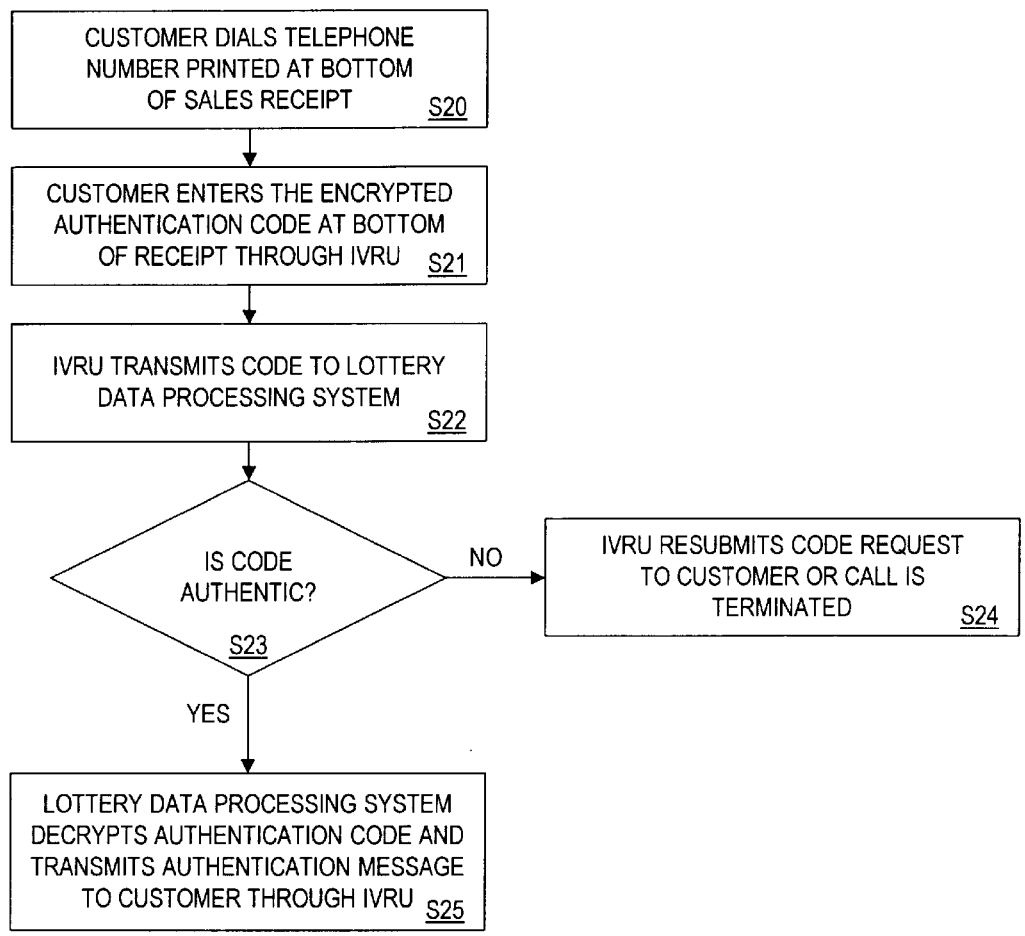
FIG. 12 is a flow chart depicting the telephone authentication process.

FIG. 12 is a flow chart depicting the telephone authentication process. The process starts when a customer dials the telephone number 87 printed on the sales receipt 80, as shown in FIG. 9, in step S20. By dialing the telephone number 87, the customer is connected to the customer assistance IVRU 75, as shown in FIG. 1. This unit, via prerecorded voice messages, prompts the customer to enter the encrypted authentication code 88; printed on the sales receipt 80 using the keys on the telephone in step S21. In step S22, the customer assistance IVRU 75 communicates this information to the lottery data processing system 60 via the IVRU interface 74, shown in FIG. 4.

In step S23, the lottery data processing system 60 searches the cryptographic code field F12 in the lottery ticket database 68*a* to find an entry that matches the information provided from the IVRU 75. If no match is found, the lottery data processing system 60 communicates to the IVRU 75 that the encrypted authentication code provided by the customer is not valid. The IVRU 75 then prompts the customer to re-enter the encrypted authentication code. After a predetermined number of failed attempts to correctly enter a valid code, the call is terminated, as shown in step S24.

If a matching entry is found, the lottery data processing system 60 decrypts the encrypted authentication code. The decrypted information is then communicated to the customer assistance IVRU 75 in step S25. Based on this information, the customer assistance IVRU 75 transmits a voice message to the customer providing all the decrypted information (i.e. lottery ticket number, time and date of purchase, etc.). The customer assistance IVRU 75 creates the voice message by combining pre-recorded voice messages stored therein.

A winning lottery ticket may be redeemed at one of the POS terminals 30 or at any conventional lottery terminal. To redeem the winning lottery ticket at one of the POS terminals 30, the POS terminal operator initiates a lottery ticket verification process by actuating a pre-programmed input designator via input device 37 associated with the POS terminal 30. The POS operator then enters the encrypted authentication code printed on the lottery ticket into the POS terminal 30 via the input device 37. This information is transmitted to the lottery data processing system 60 via the POS controller 20. The lottery data processing system 60 decrypts this information and accesses the lottery ticket database 68*a* and the winning lottery ticket number database 68*b*. The lottery data processing system 60 then determines whether the lottery ticket is a winning lottery ticket based on the information contained in the respective databases.

This determination (along with other information as needed) is then communicated back to the POS terminal 30 via the POS controller 20. Other types of information that may be included in this communication are, for example, the winning prize amount, the fractional prize amount, and whether or not there was a jackpot winning ticket.

In an alternative embodiment, the random "quick-pick" lottery numbers used for a lottery ticket transaction may be generated by the POS controller 20. These lottery numbers would then be transmitted to the lottery data processing system 60 as described above.

There are thus provided new and improved systems and methods for selling lottery tickets at point-of-sale locations in stores. The invention uses the same equipment provided for processing conventional store sales of merchandise and/or services to process lottery ticket sales.

The dual utility of the sales equipment makes the invention cost-effective for merchants. The systems and methods provided permit speedy and efficient purchasing of lottery tickets while making routine purchases of other goods, thus encouraging impulse purchasing of lottery tickets without delaying the regular flow of the point-of-sale checkout line., Further, the invention enables the quick and efficient sale of fractional lottery tickets with what would otherwise be customer change, again encouraging impulse purchases, thereby increasing the market for lottery tickets.

Figure 13:
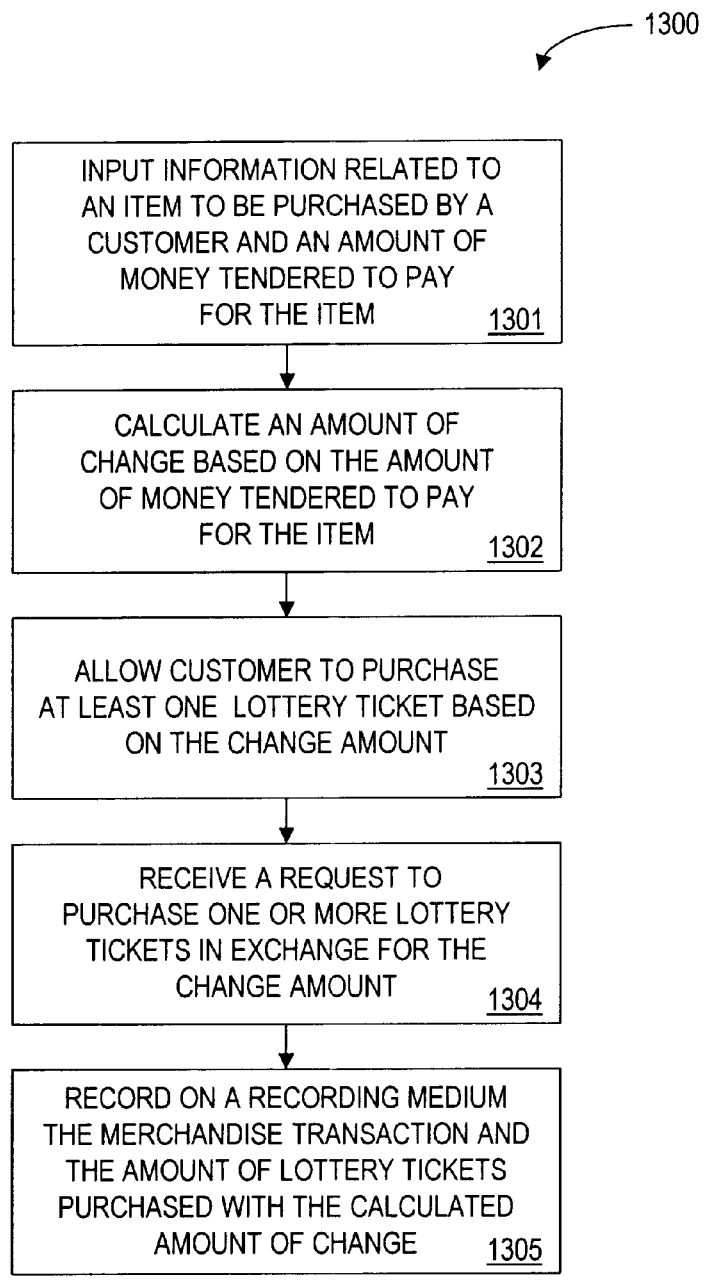
FIG. 13 is a flow chart of an exemplary process by which a customer may purchase one or more lottery tickets instead of receiving change during a merchandise transaction.

FIG. 13 is a flow chart of an exemplary process 1300 by which a customer may purchase one or more lottery tickets instead of receiving change during a merchandise transaction. With reference to FIG. 13, the process 1300 begins in step 1301 wherein a POS terminal operator employs a POS terminal to input information related to an item to be purchased by the customer and an amount of money tendered by the customer to pay for the item. In step 1302, the POS terminal calculates an amount of change due to the customer based on the amount of money tendered to pay for the item. In step 1303, the POS terminal allows the customer to purchase at least one lottery ticket based on the amount of change due to the customer; and in step 1304, the POS terminal operator receives a request from the customer to purchase one or more lottery tickets in exchange for the amount of change due to the customer. In step 1305, the POS terminal records (on a recording medium) the merchandise transaction and the amount of lottery tickets purchased with the calculated amount of change. Following step 1305 the process 1300 ends.

The present invention further provides systems and methods whereby an easy to print, easy to read, sales receipt is printed containing both the sales of goods/services and lottery ticket information. The ticket includes authenticating information, including at least one authenticating code and a customer service telephone number, which the customer can use to verify his lottery numbers with the lottery authority.

While the present invention has been described above in terms of specific embodiments, it is to be understood that the invention is not intended to be confined or limited to the embodiments disclosed herein. On the contrary, the present invention is intended to cover all methods, structures and modifications thereof included within the spirit and scope of the appended claims.

What is claimed is:

1. A method comprising:

determining a change amount of a transaction;

generating a fractional lottery ticket having a fractional amount that is based on the change amount and a full price of a lottery ticket; and exchanging the fractional lottery ticket for the change amount.

2. The method of claim 1, in which generating comprises:

printing, on a receipt, at least one of:

a price, the change amount, a code, and a plurality of lottery numbers.

3. A method comprising:

receiving a request for a lottery ticket, the request including a change amount that is based on a transaction;

calculating a fractional amount of a full lottery ticket, the full lottery ticket having a full price, the fractional amount being based on the change amount and the full price; and storing an indication of the fractional amount and an indication of the full lottery ticket.

4. The method of claim 3, further comprising:

generating a code that is based on the request.

5. The method of claim 4, in which storing further comprises:

storing an indication of the code.

6. The method of claim 4, in which the code may be used to verify the request.

7. The method of claim 3, further comprising:

generating a code that is based on the fractional amount and the full lottery ticket.

8. The method of claim 7, in which storing further comprises:

storing an indication of the code.

9. The method of claim 7, in which the code may be used to verify the fractional amount.

10. The method of claim 7, in which the code may be used to verify the full lottery ticket.

11. A method comprising:

receiving a request for a lottery ticket, the request including a change amount that is based on a transaction;

determining a fractional amount of a full lottery ticket, the full lottery ticket having a full price, the fractional amount being based on the change amount and the full price; and transmitting lottery ticket information that is based on the fractional amount.

* * * * *